UNITED STATES PATENT OFFICE 2,140,801

TREATMENT OF MATERIALS CONTAINING TANTALUM AND/OR NIOBIUM

Joseph Pierre Leemans, Hoboken, near Antwerp, Belgium, assignor to Société Générale Métallurgique de Hoboken, Hoboken, near Antwerp, Belgium, a limited company of Belgium No Drawing. Application January 27, 1938, Serial No. 187,247. In Great Britain March 22, 1937

4 Claims. (Cl. 23—16)

This invention relates to the treatment of primary materials, such as ores or metallurgical by-products, containing tantalum and/or niobium.

The object of the invention is to separate the impurities from the tantalum and/or niobium in a comparatively simple and economical way.

According to the present invention the primary material is subjected to a reducing operation in the presence of carbon, to reduce the impurities accompanying the tantalum and/or niobium in the primary material so as to leave:

(1) A slag rich in tantalum and/or niobium, practically free from the strange metals present as impurities in the primary material and (2) A ferro-alloy in which the impurities are being concentrated together with some tantalum and/or niobium.

The reducing operation may be carried out in any suitable metallurgical apparatus, e. g., in an electric furnace, with addition of carbon in such quantity as to reduce the impurities accompanying the tantalum and/or niobium in the primary material. Those impurities are being concentrated together with some tantalum and/or niobium reduced in an impure ferro-tantalum and/or ferro-niobium. If this alloy is not sufficiently carburized, it may be smelted in the presence of carbon in order to carburize as much as possible of the tantalum and/or the niobium contained.

The impure ferro-alloy obtained either directly or after the carburizing treatment just mentioned may be treated by chemical processes followed by mechanical separation in order to obtain the tantalum and/or niobium carbides free from impurities.

The slag rich in tantalum and/or niobium practically free from impurities, obtained by the original reducing operation, may be treated by any suitable known process for obtaining a commercial ferro-tantalum and/or ferro-niobium.

The first said reducing operation may be carried out in the presence of carbon and of calcium carbide or/and iron carbide.

If the raw material does not contain iron or does not contain sufficient iron for collecting the impurities, more iron should be added to the raw material before or during the treatment.

By iron carbide it is meant either pure iron carbide or iron containing iron carbide. The latter substance is however preferably used according to the invention.

I claim:

1. A process for the treatment of primary materials containing at least one of the metals tantalum and niobium, in which the primary material is subjected to a reducing operation in the presence of carbon and iron, to reduce the impurities accompanying the tantalum and niobium, so as to form a slag rich in the metals tantalum and niobium present and practically free from other metals present as impurities in the primary material, and a ferro-alloy in which these impurities are concentrated together with some tantalum and niobium.

2. A process for the treatment of primary materials containing at least one of the metals tantalum and niobium, in which the primary material is subjected to a reducing operation in the presence of iron carbon and calcium carbide, to reduce the impurities accompanying the tantalum and niobium, so as to form a slag rich in the metals tantalum and niobium present and practically free from other metals present as impurities in the primary material, and a ferro-alloy in which these impurities are concentrated together with some tantalum and niobium.

3. A process for the treatment of primary materials containing at least one of the metals tantalum and niobium, in which the primary material is subjected to a reducing operation in the presence of carbon and iron carbide, to reduce the impurities accompanying the tantalum and niobium, so as to form a slag rich in the metals tantalum and niobium present and practically free from other metals present as impurities in the primary material, and a ferro-alloy in which these impurities are concentrated together with some tantalum and niobium.

4. A process for the treatment of primary materials containing at least one of the metals tantalum and niobium, in which the primary material is subjected to a reducing operation in the presence of carbon and calcium carbide and iron carbide, to reduce the impurities accompanying the tantalum and niobium, so as to form a slag rich in the metals tantalum and niobium present and practically free from other metals present as impurities in the primary material, and a ferro-alloy in which these impurities are concentrated together with some tantalum and niobium.

JOSEPH PIERRE LEEMANS.